UNITED STATES PATENT OFFICE.

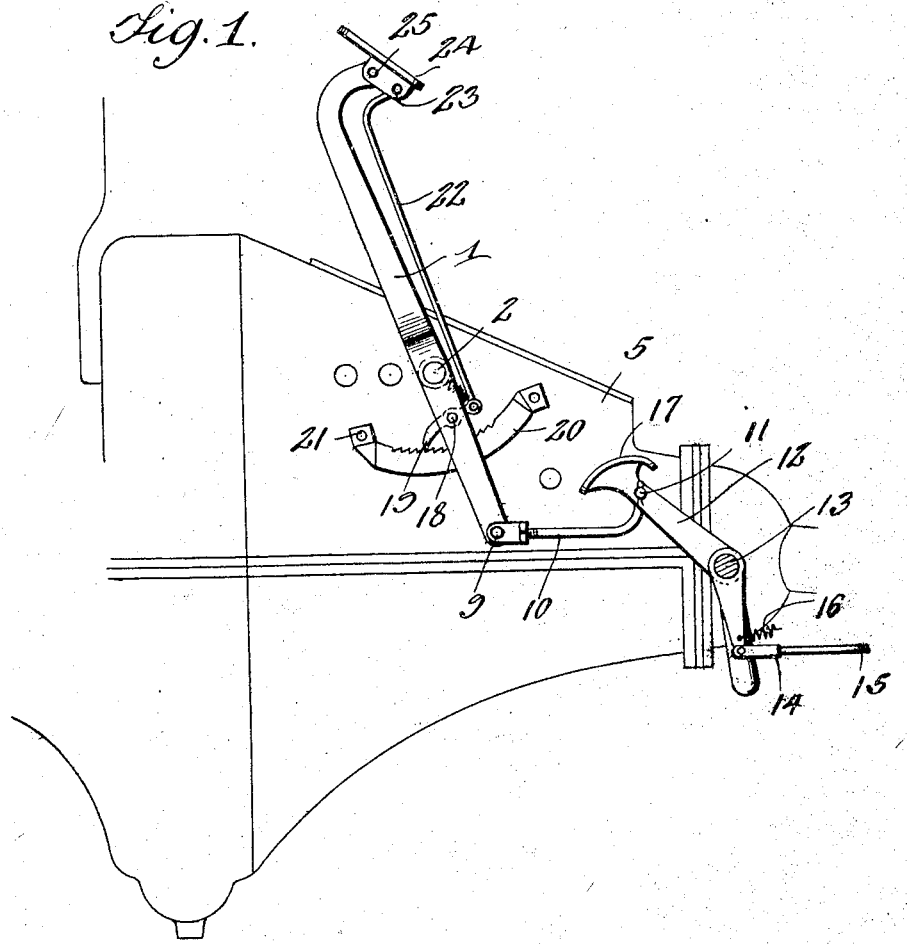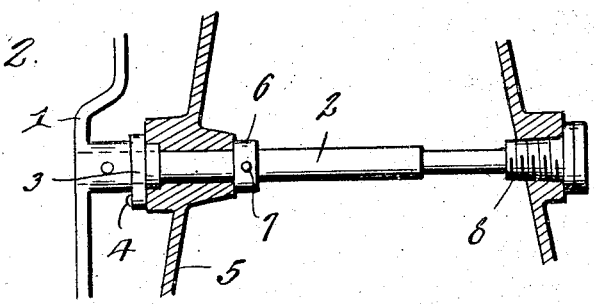

WESLEY W. WATSON, OF CARLISLE, ARKANSAS.

CLUTCH-RELEASE AND REAR-BRAKE PEDAL.

1,335,628.  Specification of Letters Patent.  Patented Mar. 30, 1920.

Application filed November 17, 1917. Serial No. 202,542.

*To all whom it may concern:*

Be it known that I, WESLEY W. WATSON, a citizen of the United States, residing at Carlisle, in the county of Lonoke and State of Arkansas, have invented new and useful Improvements in Clutch-Releases and Rear-Brake Pedals, of which the following is a specification.

This invention relates to a clutch release for the brake mechanism of a motor vehicle, the object in view being to provide clutch releasing means operable simultaneously with the foot brake lever used in conjunction with the transmission brake of a well known and popular make of motor vehicle, whereby in the forward movement of the brake pedal under the pressure of the driver's foot, the clutch is simultaneously released.

A further object of the invention is to provide means of the character hereinabove referred to which will operate with ease, celerity and safety, obviating the necessity of the operator bending over to use the present emergency brake lever, the operator not having to remove his hands from the steering wheel and not having to look for the emergency brake lever.

With the above and other objects in view, the invention consists in the novel construction, combination and arrangement of parts, herein fully described, illustrated and claimed.

In the accompanying drawings:—

Figure 1 is a side elevation of a sufficient portion of the foot brake mechanism of a motor vehicle to illustrate the present invention in its applied relation thereto.

Fig. 2 is a transverse vertical section taken about in line with the foot brake lever shaft.

Referring to the drawings 1 designates a foot brake lever which is designed to take the place of the present foot brake lever employed in conjunction with the transmission brake of a well known motor vehicle. Under the present construction now in common use, the foot brake lever is used solely to operate what is known as the transmission brake or in other words the brake band which surrounds and grips a member of the planetary transmission gearing. In carrying out the present invention, the shaft 2 which is now employed as the means for contracting the brake band above referred to and which is longitudinally movable for that purpose, is made stationary by providing a fixed bearing 3 for said shaft, said bearing being secured by fastening means 4 to the casing or housing 5 of the transmission gearing. A collar 6 is also placed around the shaft 2 and held in fixed relation to the same by means of a set screw 7. Thus there can be no longitudinal movement of the shaft 2 in relation to the casing 5 of the transmission gearing. At one end a bearing 8 for the shaft 2 is threaded through an opening in the casing 5 as shown in Fig. 2.

The lever 1 turns about the axis of the shaft 2 as a center and has connected by a pivot 9 to the lower end thereof an operating connection 10 which at its rear end has a pivotal connection at 11 with an arm 12 of what is termed the control shaft 13 of the brake mechanism of the motor vehicle, the shaft 13 in reality constitutes a rock shaft or brake shaft, the same having an arm 14 to which is connected a rearwardly extending brake rod 15 which applies the rear wheel brakes. The brakes are released by a spring 16 having one end connected to the arm 14 and the other end to a fixed part of the machine. The arm 12 is found upon motor vehicles as now constructed and has a cam surface 17 which coöperates with the remainder of the clutch releasing means (not shown).

Connected to the lever 1 by means of a pivot 18 is a pawl 19 adapted to engage a curved rack 20 secured by fastening means 21 at the opposite extremities thereof to the adjacent wall of the casing 5. At its other end the pawl has connected thereto an operating rod 22 which extends upwardly to a point near the upper extremity of the lever 1 where it is connected by a pivot 23 to a rocking pedal 24, the latter being connected by a pivot 25 to the upper end of the lever 1.

From the foregoing description taken in connection with the accompanying drawings it will now be understood that by pressing forward on the pedal 24 and rocking the lever 1 in a corresponding direction, the rear wheel brakes are applied by reason of the connections between the lever 1 and the brake shaft 13. At the same time the pawl 19 engages the rack 20 and holds the brakes applied. To release the brakes, the operator rocks his foot slightly in a downward direction and thereby lifts the pawl 19 out of engagement with the rack 20 whereupon the lever 1 is returned to its initial inoperative position.

In the use of the ordinary transmission brake mechanism, many of the gears, shafting, keys, bearings and the whole rear system are wrenched and subjected to excessive strains also resulting in broken axles, drive shafts, key ways, gears and bearings. By means of the improved clutch releasing means and rear brake pedal, the parts referred to are released from excessive strains and liability of breakage. A large percentage of drivers apply the transmission brake before disengaging the clutch, causing the shafts and gears to withstand enormous strains and such parts often break as a result thereof. It is impossible for such a condition to exist where the improved brake mechanism hereinabove described is used for the braking power is applied solely to the rear wheels. All strains on the motor transmission gearing and other parts of the machine are overcome.

I claim:—

In combination with the high speed clutch release lever of planetary transmission of an automobile, a foot lever pivoted upon the transmission casing and replacing the usual transmission brake pedal, a link connection between said clutch release lever and said foot lever, said clutch release lever being connected by pull rods with the rear wheel brakes of the automobile, a segmental rack secured upon the transmission casing, a foot engaging platform pivoted upon said foot lever, and a spring pressed pawl pivoted upon said foot lever and connected with said platform, whereupon forward movement of said pivoted foot lever will result in movement of the transmission high speed clutch into neutral position and application of said rear wheel brakes.

In testimony whereof I affix my signature.

WESLEY W. WATSON.